United States Patent [19]
Rozeboom et al.

[11] 4,330,091
[45] May 18, 1982

[54] SELF-LOADING FEED MIXER AND TRANSPORT APPARATUS

[76] Inventors: Antonie G. Rozeboom, R.R. No. 1, Doon, Iowa 51235; John H. Van Beek, R.R. No. 1, Rock Valley, Iowa 51247

[21] Appl. No.: 78,027

[22] Filed: Sep. 24, 1979

[51] Int. Cl.³ .......................................... B02C 13/26
[52] U.S. Cl. ............................... 241/73; 241/101 B; 241/101.7; 241/189 R
[58] Field of Search ............ 241/101 A, 101 B, 101.7, 241/73, 186 R, 189 R; 366/309, 310, 312, 603, 297, 298, 299, 300, 64

[56] References Cited

U.S. PATENT DOCUMENTS

| | | | |
|---|---|---|---|
| 394,431 | 12/1888 | Barret | 366/603 |
| 1,035,288 | 8/1912 | Williams | 366/297 X |
| 2,676,721 | 4/1954 | Hansen | 414/502 X |
| 2,815,941 | 12/1957 | Schmale | 241/101 B X |
| 2,894,733 | 7/1959 | Wosmek | 241/101 B X |
| 3,011,793 | 12/1961 | McElhinney et al. | 241/101.7 X |
| 3,021,121 | 2/1962 | Moss et al. | 366/298 X |
| 3,084,821 | 4/1963 | Knight | 366/603 UX |
| 3,286,862 | 11/1966 | Hansen | 366/603 UX |
| 3,409,155 | 11/1968 | Hamlet | 414/502 |
| 3,421,740 | 1/1969 | Behrens | 366/299 X |
| 3,465,801 | 9/1969 | Forster | 241/101 B X |
| 3,501,101 | 3/1970 | Lindstrom | 241/101.7 X |
| 3,604,688 | 9/1971 | Schuler | 366/603 X |
| 3,638,920 | 2/1972 | Davis | 366/300 X |
| 3,687,322 | 8/1972 | Stieren | 414/502 X |
| 3,688,827 | 9/1972 | Ryan | 366/603 UX |
| 3,738,327 | 6/1973 | Stirling | 366/603 X |
| 3,779,408 | 12/1973 | Ivie | 241/101.7 X |
| 3,790,138 | 2/1974 | Neier | 366/300 |
| 3,797,807 | 3/1974 | Behrens | 366/299 X |
| 3,926,378 | 12/1975 | Ryan | 241/101 A X |
| 3,961,718 | 6/1976 | Lucas | 241/101.7 X |
| 4,071,226 | 1/1978 | Miller | 366/64 |
| 4,082,198 | 4/1978 | Anderson et al. | 241/101.7 X |
| 4,198,799 | 4/1980 | McGrath | 241/73 X |

*Primary Examiner*—Mark Rosenbaum
*Attorney, Agent, or Firm*—Charles P. Boukus, Jr.

[57] ABSTRACT

A self-loading feed mixer and transport wagon is provided which is capable of grinding and loading a stack of livestock feed material into the wagon, thoroughly mixing the feed material together, and transporting the feed material to a desired location where it is dispensed from the wagon. The wagon includes a feed loading mechanism having a set of pulverizing chains for grinding the feed material and a blower unit for loading the material into a feed compartment. A rotatable conveyor mechanism located in the feed compartment includes a set of feed engaging paddles oriented diagonally and resiliently mounted on the conveyor shaft for advancing the feed material. One or more mixing augers are provided in the feed compartment for agitating and mixing the feed material in its advance toward a discharge area to produce a uniform feed ration. A discharge elevator is provided to dispense the mixed feed material from the wagon.

47 Claims, 15 Drawing Figures

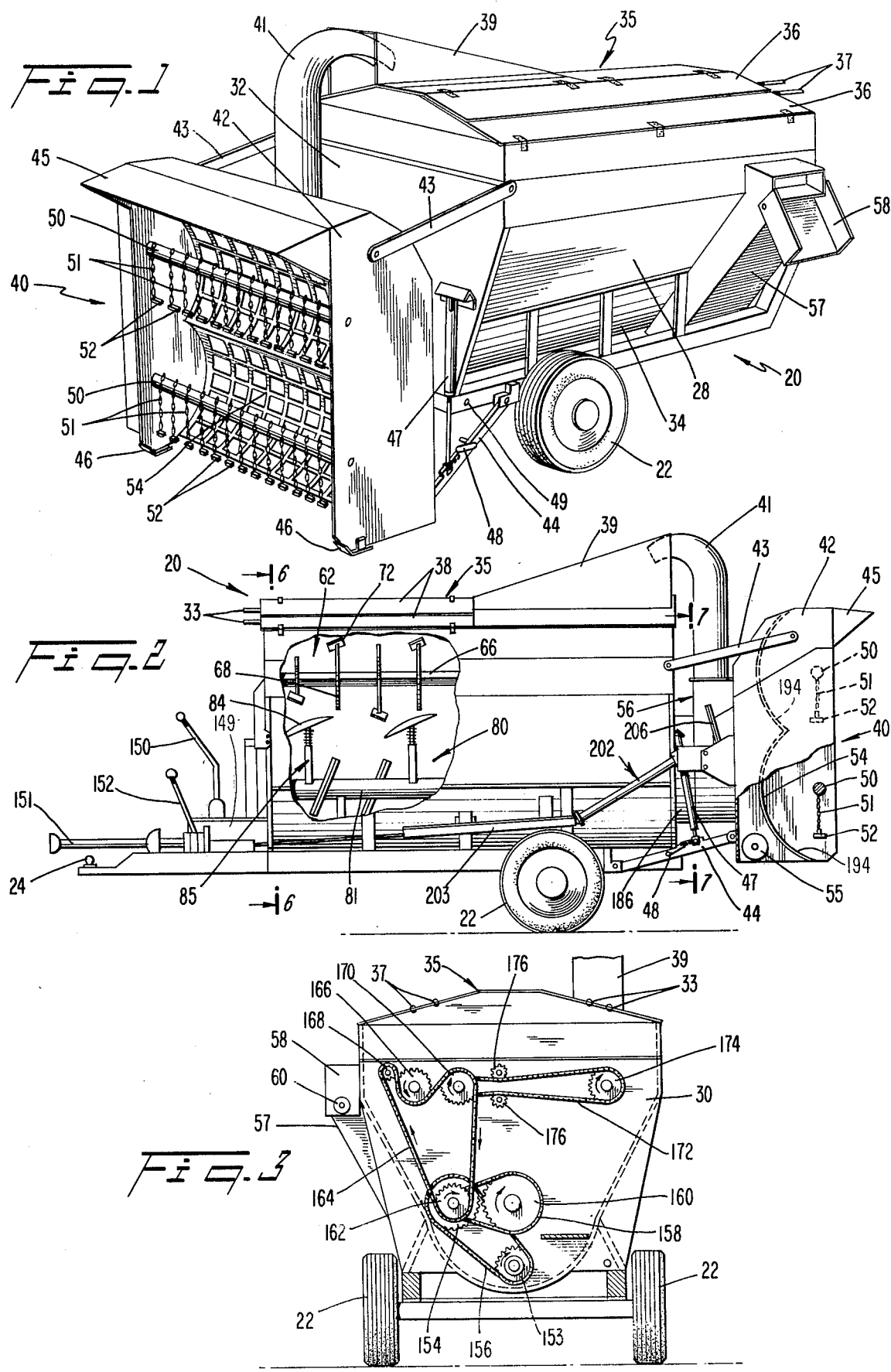

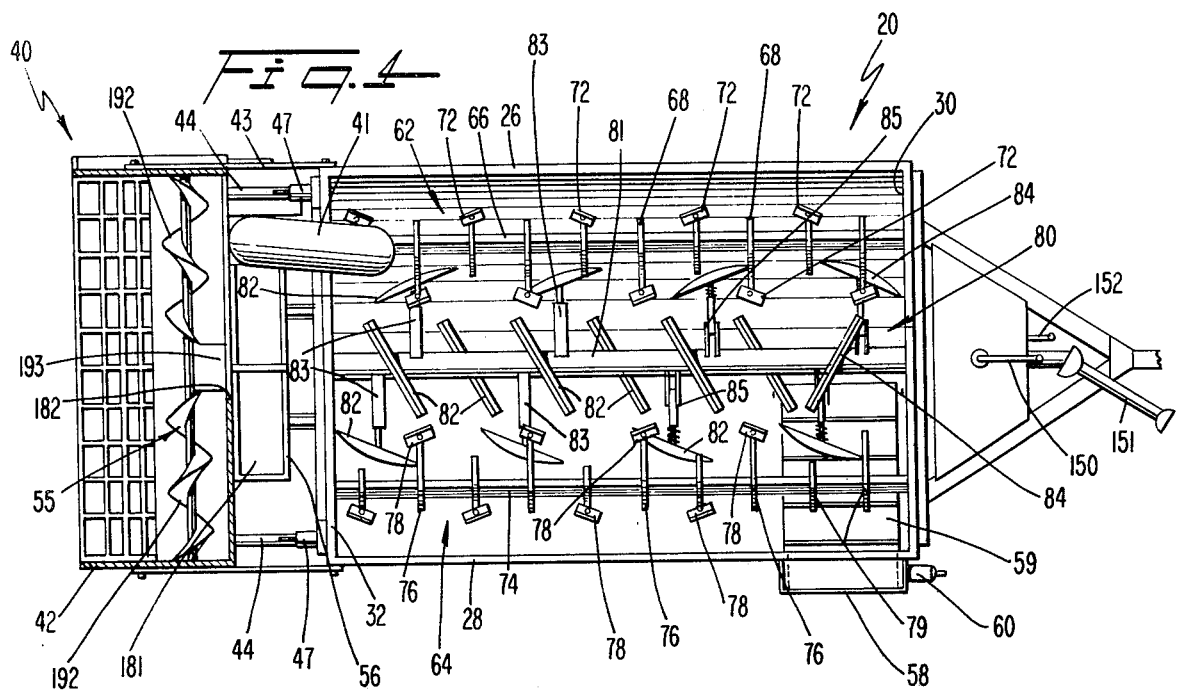
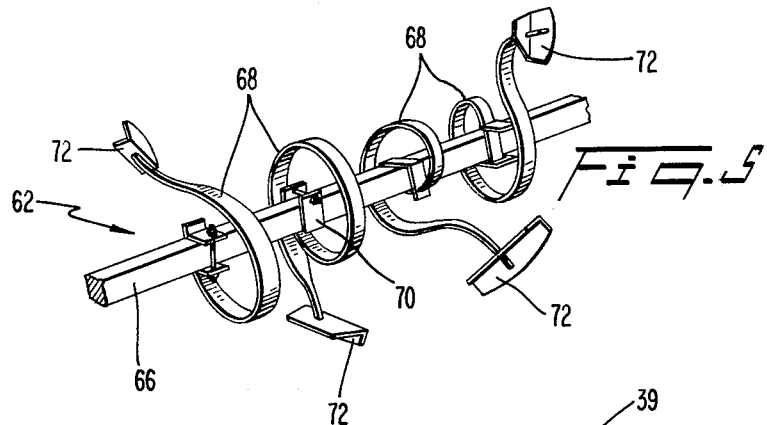
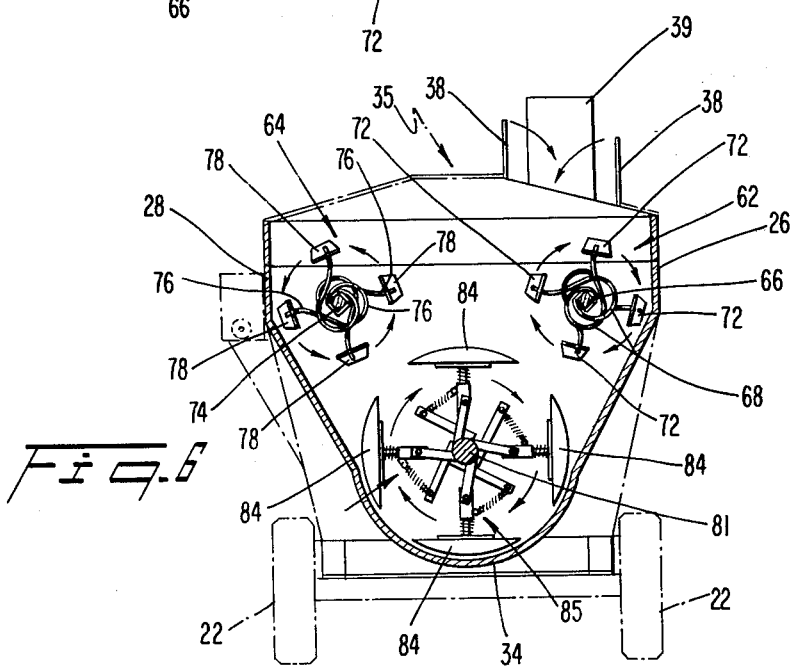

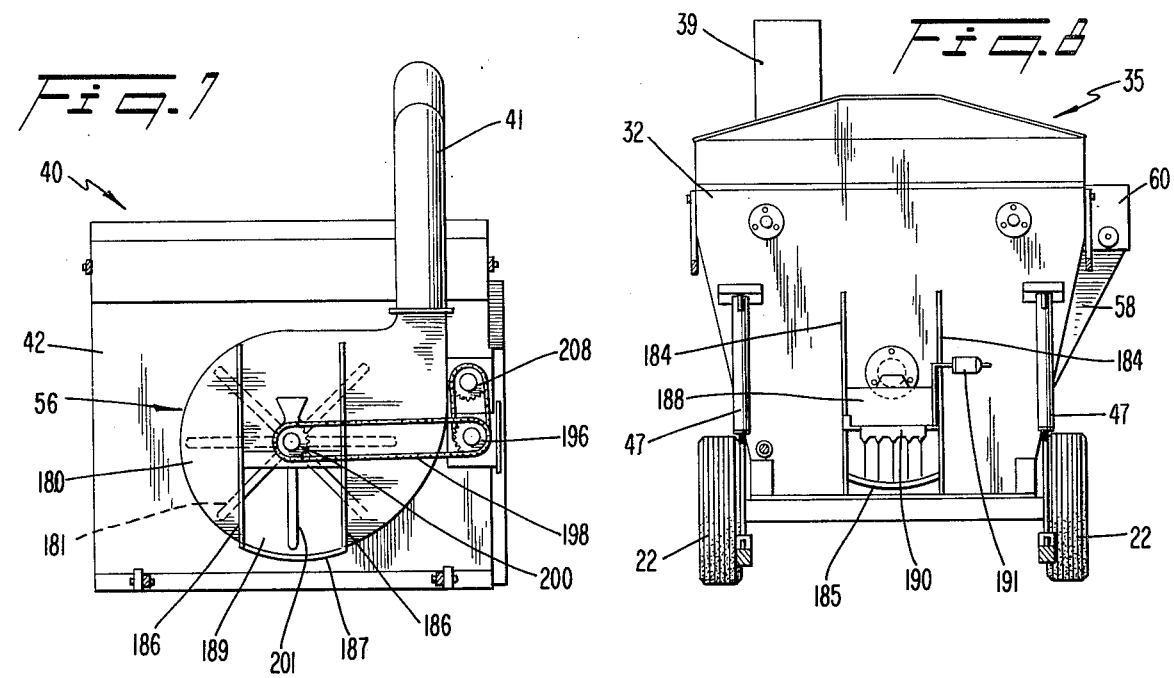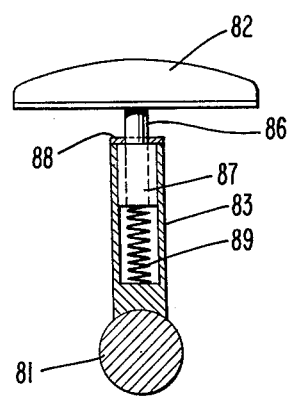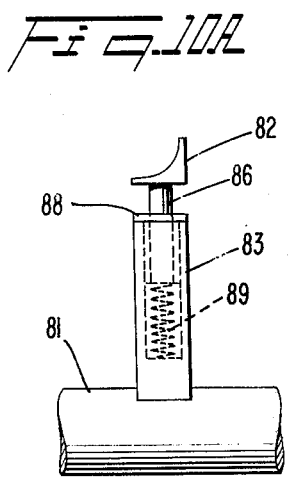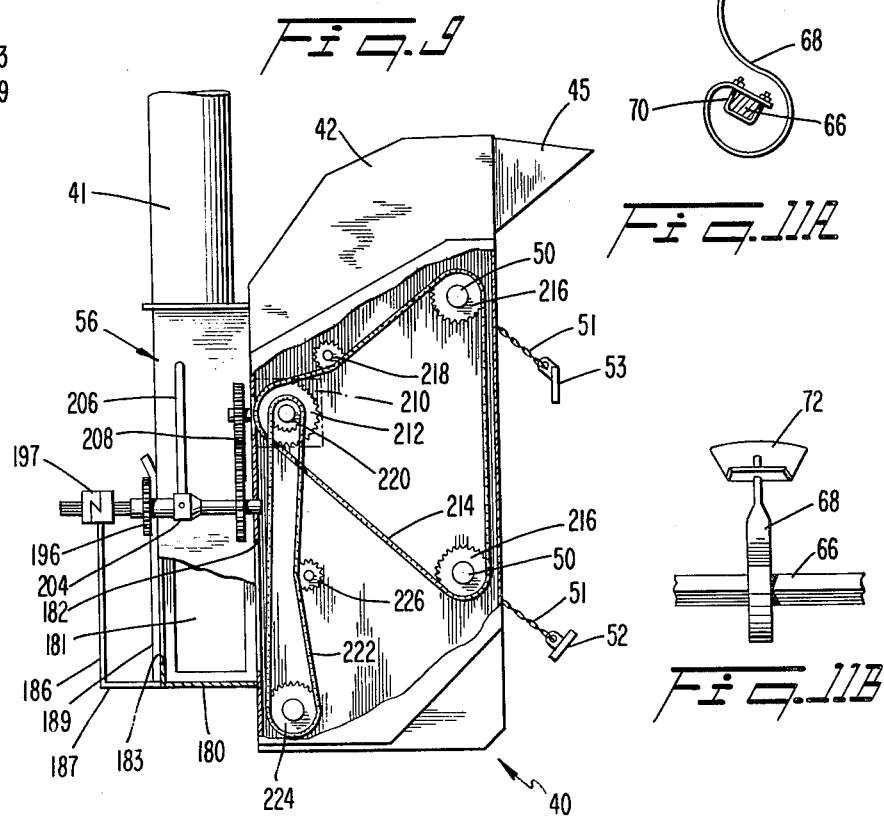

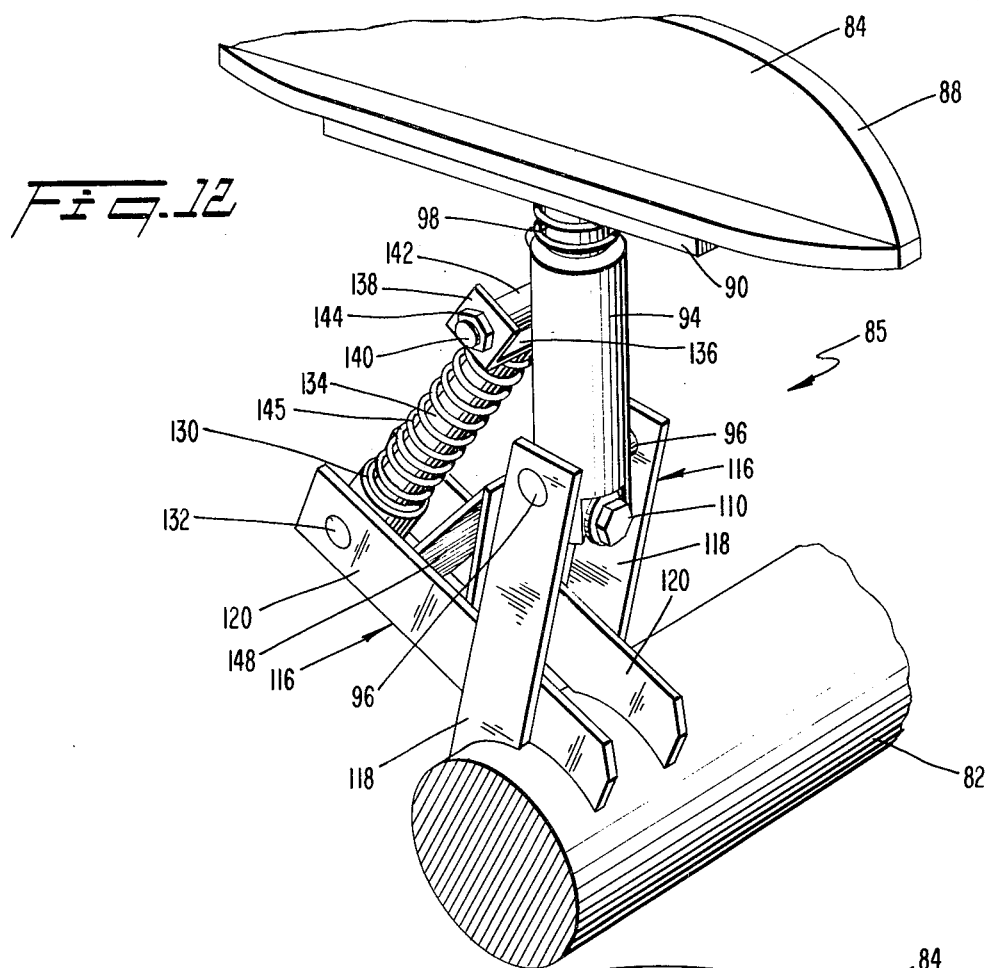
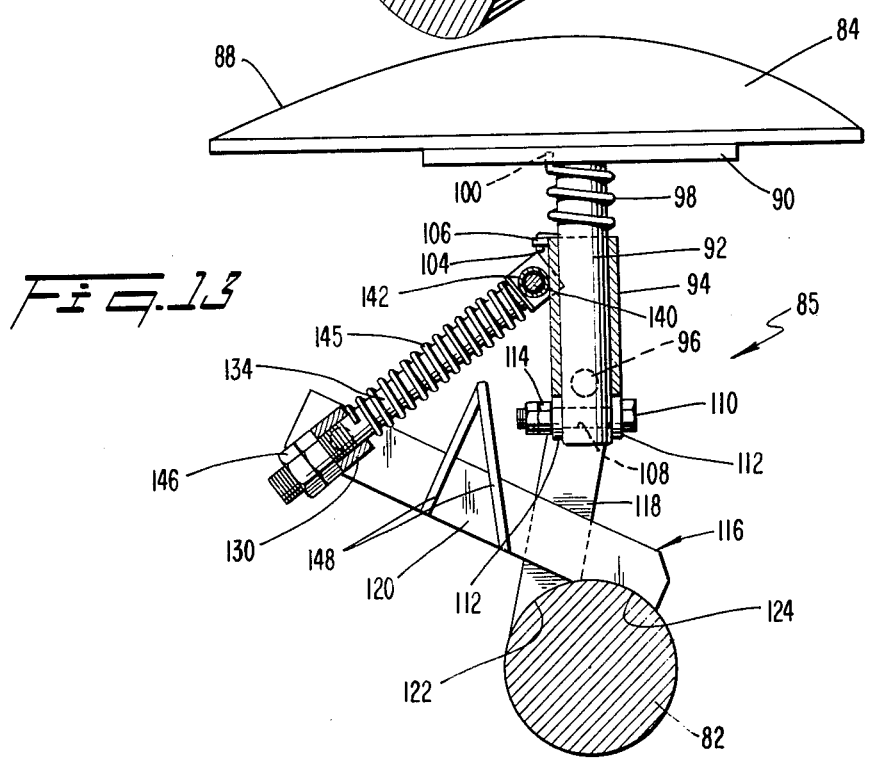

SELF-LOADING FEED MIXER AND TRANSPORT APPARATUS

FIELD OF THE INVENTION

The present invention relates to a feed mixer apparatus and, more particularly, to a self-loading feed mixer and transport vehicle capable of grinding and mixing different livestock feed materials together. Specifically, the invention provides a self-loading feed mixer and transport vehicle capable of grinding and loading a stack of feed or bedding material, e.g., hay, straw or silage, thoroughly mixing the material together, and transporting the material to a desired location where it can be spread on the ground or dispensed into a feed bunk or storage unit.

DESCRIPTION OF THE PRIOR ART

Historically, hay making and feeding operations on farms have required a significant amount of manual labor. At one time, horse drawn hay loaders were pulled through fields of mowed hay to rake and load the hay into stacks. Such a loader required not only a driver, but also one or more farm hands standing on the loader and using pitchforks to properly stack the hay. Unloading and feeding operations with such loaders were also performed manually.

More recently, modern machines have been developed to automate the handling and feeding of hay and silage to livestock. It is now customary to windrow mown hay into long parallel rows in the field to facilitate subsequent handling operations. After drying of the windrows, bale making machines are towed by tractors along the windrows to collect and form the hay into bales. Various types of hay baling machines are known which form the hay into small rectangular bales or large round bales which are wrapped by twine. The small rectangular bales can be immediately loaded into a bale accumulator or can be left in the fields and picked up by a tractor loader or bale wagon. The bales are brought to a shed or barn for storage until needed. When it is desired to feed the hay to livestock, the bales can be placed next to the fence of a livestock enclosure and the twine removed to allow the livestock to feed on the hay. To handle the large round bales, specially designed pick-up and transport machines are required. Typically, the large round bales are brought to the livestock which feed on the bale without further processing. Again, it is necessary to remove the twine from the bales before feeding of livestock. Baling machines have also been developed which form the hay into large rectangular blocks. These blocks are typically transported over relatively long distances before the hay is fed to livestock.

In addition, tractor-operated hay stacking machines have been developed which stack the windrowed hay into giant round stacks or into loaf-shaped stacks. The stacks formed by these machines are generally left in the field and transported by stack loading and moving platforms to desired storage areas. The livestock can be allowed to feed directly on the large stacks without further processing. Alternatively, the stacks may be fed to a chopper which grinds and dispenses the hay for feeding by livestock.

After the hay is baled or stacked, further processing of the hay is desirable to provide a more palatable and nutritious livestock feed and minimize waste. For example, the bale or stack of hay may be transferred by a front end tractor loader into a tub grinder which grinds the hay into small pieces. In addition, the ground hay can be mixed with other ingredients, e.g., silage, corn meal and molasses, to produce a more palatable and nutritious feed material. Typically, the ground hay is loaded into a feed mixer wagon in which it is blended with the other ingredients. The wagon is customarily designed to dispense the mixed feed material into a feed bunk or to spread the feed material along the ground.

No single machine has been developed which satisfactorily embodies the capabilities which enable a stack of hay to be ground, loaded, mixed with other feed material, transported to a livestock feed area, and unloaded for feeding to livestock. For example, previous proposals relating to feed grain grinding and mixing vehicles are disclosed in Schmale, U.S. Pat. No. 2,815,914; Forster, U.S. Pat. No. 3,465,801; and Lindstrom, U.S. Pat. No. 3,501,101. In addition, Wosmek, U.S. Pat. No. 2,894,733 discloses a portable grinding and mixing device for livestock feed. The primary objective of these devices is to provide a machine which grinds, mixes and blends feed grains for livestock. Generally, such grain grinding devices are unsuccessful when applied to roughage. Moreover, these devices are not self-loading machines but include loading hoppers into which the feed grains must be moved. In contrast, the present invention is capable of grinding and loading itself simultaneously. It is not necessary for the feed material to be moved into any type of loading hopper, but rather the material is picked up, pulverized and loaded in one simultaneous operation.

In addition, feed mixing units which utilize conventional screw-type augers to advance and mix livestock feed material are well known in the prior art. See, for example, U.S. Pat. Nos. 3,421,740; 3,501,101; 3,790,138 and 3,797,807. Typically, the prior art units incorporate conventional screw-type conveyor augers which mix and advance the feed material to a discharge conveyor which dispenses the material to a desired location. In some instances, additional mixing augers are provided to assist the main conveyor augers in the mixing of the feed material. For example, Behrens, U.S. Pat. Nos. 3,421,740 and 3,797,807 disclose a feed mixer including a plurality of screw-type augers provided with rigid paddles to achieve enhanced agitation when the feed material is advanced. Neier U.S. Pat. No. 3,790,138 discloses a feed mixer provided with a pair of screw augers at the bottom of its mixing chamber and a pair of agitators provided with diagonally arranged rectangular paddles in an upper portion of the chamber to agitate the feed material.

Although these designs have purported to enhance the mixing action of conventional mixer units, these units usually have a large power requirement and also a tendency to jam in operation, particularly when the feed material itself tends to stick together and form wads of material which are difficult to break up and advance. Sometimes, it is necessary to interrupt the operation of the mixing unit and manually break up the wadded feed material before operation of the machine can be resumed. The need for manual operations is time consuming and defeats the intended purpose of the machine to simplify feed handling and mixing operations. Moreover, the jamming of the machine results in undesirable stresses on the machine components which can lead to damage and total breakdown of the machine. The stresses encountered in a conventional mixer unit are sometimes sufficient to push its screwn augers out of the bearings which support the augers. Further, to withstand these stresses, conventional screw augers normally have a substantial thickness which makes them heavy and require a large amount of power to operate.

In the handling and mixing of feed material, the most difficult materials to mix are those including large amounts of dry material such as hay which are mixed with equal of smaller amounts of moist material, e.g., silage, where the mixture tends to adhere together and form wads which are difficult to break up and advance. In addition, serious difficulty is encountered where the mixed material has a gummy, pasty or sticky consistency. It is these types of feed materials which are most difficult to effectively mix with conventional mixer units.

In view of the above drawbacks of conventional mixer units, there is a definite need for an improved feed handling and mixer unit capable of effectively mixing different types of feed material and producing a uniform livestock ration with a minimal power requirement. It is especially desirable to provide a machine which is capable of grinding, loading, mixing and dispensing the feed material without the need for any additional equipment or apparatus.

SUMMARY OF THE INVENTION

An object of the present invention is to provide a feed mixer apparatus capable of handling and mixing all types of livestock feed material to produce a uniform feed ration.

Another object of the invention is to provide a self-loading feed mixer apparatus capable of effectively grinding, loading, mixing and dispensing livestock feed material.

Another object of the invention is to provide a feed loader and mixer apparatus which includes a cover to minimize the escape of small feed particles or feed dust.

It is also an object of the invention to provide a feed mixer apparatus incorporating an improved auger arrangement to minimize the tendency of the apparatus to jam when handling feed material which tends to form sticky wads of material.

Another object of the invention is to provide a feed mixer apparatus including an improved conveyor auger which relieves the pressure on the feed material when it tends to bunch up to avoid breakdown or damage of the apparatus.

It is another object of the invention to provide a feed mixer vehicle which operates efficiently and requires less power than previous devices.

A further object of the invention is to provide a feed mixer vehicle which is readily transportable and operable by a conventional tractor to grind, load, mix and dispense feed material for livestock without the use of any other machine.

A further object of the invention is to provide a feed loader and mixer apparatus with alternative discharge mechanisms which permit the mixed feed material to be dispensed into other containers or to be spread on the ground for livestock bedding.

It is a further object of the invention to provide a feed loader and mixer unit which can be embodied in a self-propelled vehicle.

In accordance with the invention, a self-loading feed mixer apparatus comprises a feed compartment adapted to receive a load of feed material, conveyor means including a shaft rotatably mounted along the bottom of the feed compartment and a set of feed engaging paddles spaced along the conveyor shaft for advancing the feed material in a predetermined direction through the compartment upon rotation of the conveyor shaft, mixer means mounted in the feed compartment above the conveyor means for agitating and mixing the feed material, and loading means mounted outside the feed compartment for pulverizing a stack of feed material and loading the material into the compartment. Preferably, each feed engaging paddle is positioned in a diagonal orientation relative to the axis of the conveyor shaft to advance the material. At least one of the feed engaging paddles is rotatably mounted on the conveyor shaft with the paddle normally located in its diagonal orientation relative to the axis of the shaft and being rotatable toward a perpendicular orientation when the feed material tends to bunch up to relieve the pressure thereon.

In a preferred embodiment, each feed engaging paddle is mounted on a radial support stem slidably attached to the conveyor shaft to allow the paddle to move radially relative to the shaft to relieve pressure on the feed material. Preferably, at least one radial support stem is pivotably attached to the conveyor shaft to allow the support stem and its paddle to pivot out of the path of wadded material advanced through the feed compartment. The radial support stem may be rotatably mounted on the conveyor shaft to allow its paddle to rotate relative to the shaft to relieve pressure on the feed material.

The preferred embodiment also includes a pair of spaced, parallel mixing augers rotatably mounted in an upper portion of the feed compartment and extending parallel to the conveyor shaft. Each mixing auger includes a plurality of mixing teeth mounted on a set of resilient support arms spaced along the mixing auger. Preferably, each of the mixing teeth is oriented diagonally relative to the axis of the mixing auger for moving the feed material in the opposite direction from the main conveyor paddles. Upon rotation of the mixing augers, the mixing teeth serve to simultaneously agitate, advance and mix the feed material.

In accordance with a preferred embodiment, the loading means includes a housing mounted on the outside of the feed compartment, a plurality of pulverizing chains mounted on a rotable shaft within the housing for thrashing the stack of feed material, and a screen member spaced from the rotatable shaft within the housing and cooperable with the pulverizing chains for grinding the feed material upon rotation of the shaft. Preferably, the loading means includes a blower unit for receiving the ground feed material and blowing the material into the feed compartment. The loading means also includes auger means located behind the screen for feeding the ground feed material into the blower unit. Preferably, means is provided for raising and lowering the housing relative to the feed compartment to allow the pulverizing chains to engage the stack of feed material at different levels.

The feed mixer apparatus preferably includes a discharge elevator for discharging the mixed feed material from the feed compartment. Preferably, one or more of the feed engaging paddles on the conveyor shaft adjacent to the discharge area are reversed in diagonal orientation to relieve pressure on the feed material advanced to the discharge elevator. The discharge elevator allows the feed material to be dispensed from the feed compartment into a feed bunk or to be spread along the ground. Alternatively, the blower unit and adjustable discharge spout may be used to dispense the mixed feed material from the feed compartment into other storage areas or to spread refuse for livestock bedding.

BRIEF DESCRIPTION OF THE DRAWINGS

The accompanying drawings illustrate a preferred embodiment of the present invention and, together with the description, serve to explain the principles of the invention.

FIG. 1 is an overall perspective view of a self-loading feed mixer and transport wagon embodying the present invention;

FIG. 2 is a side elevation, partially cutaway, of the feed mixer and transport wagon illustrating the conveyor and mixing augers provided in its feed compartment;

FIG. 3 is a front elevation illustrating the drive chain assembly of the feed mixer and transport wagon;

FIG. 4 is a plan view partially in section illustrating the feed mixer and transport wagon with its cover removed;

FIG. 5 is an enlarged perspective view of the mixing auger used in the feed mixer and transport wagon;

FIG. 6 is a cross section of the feed mixer and transport wagon taken along line 6—6 of FIG. 2;

FIG. 7 is a rear view of a feed loading mechanism employed in the feed mixer and transport wagon taken along line 7—7 of FIG. 2;

FIG. 8 is a rear elevation of the feed mixer and transport wagon with the feed loading mechanism removed;

FIG. 9 is an enlarged side view, partially cutaway, of the feed loading mechanism;

FIGS. 10A and 10B are front and side views, respectively, illustrating the structure of the feed engaging paddles mounted on the conveyor at the rear of the feed compartment;

FIGS. 11A and 11B are front and side views, respectively, illustrating the structure of the mixing teeth and resilient support arms provided on the mixing augers;

FIG. 12 is an enlarged perspective view illustrating the structure of the feed engaging paddles provided on the conveyor at the front of the feed compartment; and FIG. 13 is an enlarged front view, partially in section, of the feed engaging paddle of FIG. 12 and its support arm assembly.

DETAILED DESCRIPTION OF THE PREFERRED EMBODIMENT

Referring to FIG. 1, there is shown a self-loading feed mixer and transport wagon, generally 20, including a set of ground engaging wheels 22 and a trailer hitch 24 (FIG. 2) which allows the wagon to be towed by a conventional tractor or other farm vehicle. Although a tractor-drawn wagon is specifically shown and described herein, it will be understood by persons skilled in the art that the invention may also be embodied in a self-propelled machine.

As shown in FIGS. 4 and 6, the mixer and transport wagon includes a feed compartment defined by a pair of side walls 26 and 28, a pair of upright end walls 30 and 32 and a bottom wall 34. The lower portions of side walls 26 and 28 are slanted inwardly and aligned with the upper edges of bottom wall 34 (FIG. 6) which is rounded in configuration. The arrangement of slanted side walls and rounded bottom wall may be varied in size and configuration to accommodate different sized conveyor augers.

The wagon includes a cover, generally 35 (FIG. 1), mounted on top of the feed compartment. The cover retains feed dust in the feed compartment while loading and mixing operations are performed. It also provides protection against inclement weather conditions. Cover 35 is provided with a set of hinged panels or doors 36, each including a handle 37 at its front end for opening and closing the doors. Another set of doors 38 (FIG. 2), each including a handle 33, is provided on the opposite side of cover 35 adjacent to the front of the wagon. Doors 36 and 38 provide alternate access means for inserting ingredients such as ground corn and molasses directly into the feed compartment. A shroud 39 extends upward from cover 35 behind doors 38 for receiving and directing ground feed material into the feed compartment.

As shown in FIGS. 1 and 2, feed mixer and transport wagon 20 is provided with a feed loading mechanism, generally 40, which is adapted to pulverize a stack of silage or other livestock feed material on the ground and load the feed material via an adjustable discharge spout 41 into the feed compartment. Discharge spout 41 is normally received within shroud 39. Feed loading mechanism 40 includes an open-faced rectangular housing 42 which is adjustably mounted on wagon 20 by an upper pair of pivot arms 43 and a lower pair of pivot arms 44. A protective visor 45 is pivotally mounted at the upper end of open-faced housing 42 and a pair of reinforcing feet 46 is mounted on its lower edges. A pair of hydraulic lift cylinders 47 is mounted on rear wall 32 of the wagon and attached to the respective lower pivot arms 44 to raise and lower feed loading mechanism 40 while loading operations are performed. A lock pin 48 is slidably mounted on each pivot arm 44 and adapted to engage a corresponding hole 49 provided in the frame of the wagon to lock the feed loading mechanism in a raised position (FIG. 2) when not used for loading operations.

Referring to FIG. 1, feed loading mechanism 40 includes a pair of vertically spaced, rotatable supports or shafts 50 extending horizontally between opposite sides of housing 42. A plurality of flail-like pulverizing members, e.g., a set of chains 51 each provided with a hammer 52, is mounted on each shaft 50. As shown in FIG. 9, each hammer 52 consists of a flat metal plate secured by a integral flange to chain 51 and oriented perpendicularly to the chain. Alternatively, one or more hammers 53 may be provided which are diagonally oriented. Upon rotation of shafts 50, pulverizing chains 51 and hammers 52 are used to thrash a stack of feed material (not shown) which is driven into a screen member 54 mounted behind shafts 50 to grind the feed material. An auger 55 (FIG. 2) is located behind the screen member for feeding the ground feed material to a blower unit 56 which conveys the material through discharge spout 41 into the feed compartment. The structure and operation of the feed loading mechanism and blower unit are explained in more detail below.

The feed mixer and transport wagon includes a discharge chute 57 extending upwardly and outwardly from side wall 28 adjacent to the front end of the wagon. Discharge chute 57 is provided with a hinged spout 58 which is flipped downward to an open position (FIG. 1) to allow the feed material to be discharged and is flipped upward to a closed position (FIG. 3) to close the discharge chute. A discharge elevator 59 (FIG. 4) operable by a hydraulic motor 60, is mounted at the discharge end of the feed compartment for dispensing feed material from the discharge chute.

As shown in FIGS. 4 and 6, the feed mixer and transport wagon includes a pair of auger-like mixing devices 62 and 64 which extend longitudinally between end walls 30 and 32 and are rotatably mounted adjacent to side walls 26 and 28, respectively, for agitating and mixing the feed material in an upper portion of the feed compartment. Mixing auger 62 (FIG. 5) comprises an elongated, rectangular shaft 66 provided with a plurality of spiral-shaped spring arms 68 spaced apart along the shaft. Preferably, as shown in FIGS. 5 and 6, spiral-shaped spring arms 68 are arranged such that successive spring arms are angularly displaced by 90° along the length of shaft 66. Each spiral-shaped spring arm 68 is bolted by a U-shaped clamp 70 (FIG. 11A) to rectangular shaft 66. An agitating element or mixing tooth 72 is secured to the free end of each spiral-shaped spring arm 68. Preferably, mixing teeth 72 are oriented diagonally relative to the axis of shaft 66. Similarly, mixing auger 64 comprises an elongated, rectangular shaft 74 including a plurality of spiral-shaped spring arms 76 spaced apart along the shaft and angularly displaced by 90° relative to each other. Spring arms 76 are provided with mixing teeth 78 oriented diagonally relative to the axis of shaft 74.

Preferably, mixing teeth 72 and 78 are oriented to move the feed material rearwardly in the feed compartment. In addition, as shown in FIG. 4, one or more spiral-shaped spring arms 79 without mixing teeth may be provided on shaft 74 above discharge elevator 59 to agitate the feed material in this area. If desired, several of the other mixing teeth 72 and 78 may be eliminated from the mixing augers. In addition, screw type auger sections (not shown) may be spaced along shafts 66 and 74 to enchance the mixing action in the feed compartment.

As shown in FIGS. 2 and 4, a paddle auger conveyor mechanism, generally 80, is rotatably mounted along the bottom of the feed compartment for advancing the feed material forwardly through the compartment toward a discharge area adjacent to discharge elevator 59. Conveyor mechanism 80 comprises a rotatable shaft 81 extending longitudinally between end walls 30 and 32 at the bottom of the feed compartment. A first set of feed engaging paddles 82 is resiliently mounted at spaced locations along conveyor shaft 81 by a corresponding set of paddle support arms 83 at the rear of the feed compartment. Each paddle 82 is non-rotatably mounted on its support arm 83 and oriented diagonally relative to the axis of shaft 81. A second set of feed engaging paddles 84 is resiliently mounted at spaced locations along conveyor shaft 81 on a corresponding set of paddle support arms 85 at the front of the feed compartment. Each paddle 84 is rotatably mounted on its support arm 85 and normally oriented diagonally relative to the axis of shaft 81. Each successive paddle and support arm is angularly displaced by 90° with respect to the adjacent paddles and support arms on shaft 81.

Referring to FIGS. 10A and 10B, each paddle 82 at the rear of the feed compartment has a generally flat face for engaging and advancing feed material upon rotation of conveyor shaft 81 and a curved outer edge which allows the paddle to freely rotate past the inner curved surface of bottom wall 34 of the feed compartment. Paddle 82 is secured, e.g., by welding, to a round shaft or stem 86 having a square tube 87 welded to its lower end and slidably and non-rotatably received within support arm 83 which is hollow and square in cross section. A collar 88 is welded on top of arm 83 to limit the outward movement of paddle 82 and stem 86. In addition, a compression spring 89 located within hollow support arm 83 engages stem 86 to normally urge paddle 82 outward relative to conveyor shaft 81. Paddle 82 and stem 86 are slidable radially inward toward shaft 81 to relieve the pressure on the livestock feed advanced through the feed compartment. Spring 89 serves to normally urge paddle 82 into close engagement with bottom wall 34 of the feed compartment and to allow the paddle to slide radially inward relative to the conveyor shaft to relieve pressure on the livestock feed material as it is advanced.

Referring to FIGS. 12 and 13, each paddle 84 at the front of the feed compartment comprises an L-shaped blade having a flat face for engaging and advancing the feed material and a curved outer edge which allows the paddle to freely rotate past the inner curved surface of bottom wall 34 (FIG. 6) of the feed compartment. Paddle 84 is secured, e.g., by welding, to a mounting plate 90 which, in turn, is welded to a shaft or stem 92. Preferably, paddle 84 is mounted slightly off center on stem 92. The stem is slidably and rotatably received in a cylindrical sleeve 94 provided with a pair of diametrically opposed pivot pins 96 extending outwardly at its base. A coil spring 98 encircles an upper portion of shaft 92 and includes a first finger 100 at its upper end which is anchored in a suitable aperture provided in mounting plate 90 and a second finger 104 at its lower end which is anchored in an aperture formed in a lug 106 provided at the top of sleeve 94. Coil spring 98 serves to normally bias paddle 84 into a diagonal orientation relative to the axis of shaft 81 and radially outward from the shaft. The spring permits paddle 84 to rotate within sleeve 94 about the axis of stem 92 and to slide vertically relative to the sleeve. The lower end of stem 92 is provided with a bore 108 for receiving a bolt 110 which supports a pair of roller busings 112 on opposite sides of the stem for rolling engagement with the bottom end of sleeve 94. A set of nuts 114 is provided to secure bolt 110 in place.

Each paddle support arm assembly includes a pair of mounting brackets 116, each including a main paddle support arm 118 and a lateral brace 120 which are criss-crossed and welded together. Paddle support arm 118 and lateral brace 120 are provided with rounded contact surfaces 122 and 124, respectively, which conform to the outer surface of shaft 81 and facilitate welding of mounting bracket 116 to the shaft. Each paddle support arm 118 is provided with an aperture at its upper end for receiving one pivot pin 96 of sleeve 94 to pivotally support the sleeve and paddle 84. Each lateral brace 120 is provided with an aperture at its outer end to pivotally support a collar 130 provided with a pair of diametrically opposed pivot pins 132 which are received in the apertures. A clevis rod 134 is slidably received within collar 130. The rod includes a clevis 136 at its upper end having a pair of flanges 138 provided with apertures for receiving a bolt 140 which is received in a collar 142 on sleeve 94 and is held in place by a set of nuts 144 to pivotally connect the rod to the sleeve. An elongated coil spring 145 is mounted on rod 134 between collar 130 and clevis 136 to normally bias sleeve 94 and paddle 84 into an upright position relative to shaft 81. A set of nuts 146 is threaded on the lower end of rod 134. A pair of stop members 148 is welded to brackets 116 to limit the pivotal movement of sleeve 94.

As shown in FIGS. 4 and 12, coil spring 98 normally biases feed engaging paddle 84 into a diagonal, feed advancing position relative to shaft 81. When shaft 81 is rotated (in a clockwise direction as viewed in FIG. 6), feed engaging paddles 84 advance the feed material forwardly toward the discharge area of the wagon. If the feed material tends to clog or bunch up, coil spring 98 permits paddle 84 to rotate toward a position perpendicular to shaft 81 to slow or halt the forward advance of the feed material. Coil spring 98 also perits limited sliding motion of paddle 84 relative to sleeve 94 to avoid excessive stess on the paddle and prevent possible jamming in the operation of the wagon. Compression spring 146 normally biases paddle 84 and sleeve 92 into a upright position. However, when a large wad of feed material is advanced along the bottom of the feed compartment, compression spring 145 permits rod 134 to slide within collar 130 to pivot sleeve 94 and paddle 84 laterally out of the path of the wad of material. This lateral pivot action also avoids excessive stress on the feed engaging paddles and prevents possible jamming in the operation of the wagon.

In a preferred embodiment, a total of sixteen feed engaging paddles 82 and 84 is provided on conveyor shaft 81. At the rear of the wagon where the feed material is loaded into the feed compartment, non-rotatable paddles 82 are employed to advance the feed material. For example, eight or ten of such paddles may be provided on the conveyor shaft. At the front of the feed compartment where the feed material is advanced toward the discharge area, rotatably mounted paddles 84 are employed to advance the feed material. For example, six or eight of such paddles may be provided on the conveyor shaft. Two or more paddles 84 located adjacent to discharge elevator 59 are reversed in diagonal orientation relative to the conveyor shaft. These reversed paddles serve to relieve pressure on the feed material advanced to the discharge area and to prevent the feed material from being forced against front wall 30 of the feed compartment.

Referring to FIG. 2, feed mixer and transport wagon 20 has a conventional power transmission 149, operable by a control lever 150, which may be coupled to the power take-off of a tractor (not shown) via a coupling shaft 151 to drive the mixing augers and conveyor mechanism of the wagon via a sprocket and chain drive system (FIG. 3) mounted on front wall 30 of the wagon. A separate clutch assembly 152 is drivingly connected to shaft 151 to supply power to feed loading mechanism 40. As shown in FIG. 3, the drive system includes a sprocket 153 driven by the output of transmission 149 coupled to a sprocket assembly 154 via a drive chain 156. Sprocket assembly 154 includes a small sprocket (not shown) coupled via a chain 158 to drive sprocket 160 for the paddle conveyor mechanism 80 at the bottom of the feed compartment. Sprocket assembly 154 includes an intermediate sprocket 162 coupled via a chain 164 to drive sprocket 166 for mixing auger 64 at the top of the feed compartment. Drive chain 164 travels around a stationary idler sprocket 168 and a reversing sprocket 170 to obtain rotation of sprocket 166 in a counterclockwise direction. Sprocket 170 is mounted for rotation with another sprocket of identical size (not shown) which is coupled via a chain 172 to a drive sprocket 174 for mixing auger 62. A pair of spring-biased idler sprockets 176 engage drive chain 172 to provide the desired tension on the chain. Drive sprocket 174 is driven in a clockwise direction.

Referring to FIG. 6, conveyor shaft 81 is driven in a clockwise direction to advance the feed material forwardly in the compartment via feed engaging paddles 82 and 84. Mixing auger 62 is rotated in a clockwise direction such that each of its mixing teeth 72 approaches side wall 26 while moving in a generally downward direction. Similarly, mixing auger 64 is rotated in a counterclockwise direction such that each of its mixing teeth 78 approaches side wall 28 while moving in a generally downward direction. This downward motion of the mixing teeth relative to the side walls avoids clogging of the feed material against the side walls of the feed compartment. Once mixing teeth 72 and 78 reach their lowermost positions in the feed compartment, the teeth move upwardly over conveyor mechanism 80 to achieve a uniform mixture of the feed material.

Referring to FIGS. 7 and 9, blower unit 56 includes a rounded blower housing 180 provided on feed loading mechanism 40 which contains a six-bladed blower fan 181. An opening 182 formed in housing 42 provides communication between one side of the blower unit and the interior of the housing. An opening 183 is formed in the other side of the blower unit for registration with a similar opening formed in rear wall 32 of the wagon. A set of frame members 184 and a ledge 185 project outwardly from rear wall 32 at the sides and bottom of the opening formed therein. Similarly, a set of side frame members 186 and a ledge 187 project outwardly from blower enclosure 180 adjacent to opening 183 therein. A slidable door 188 (FIG. 8) on rear wall 32 and another slidable door 189 (FIG. 7) on blower unit 56 are provided to selectively control the communication between the blower unit and the feed compartment. An oscillating fork mechanism 190 powered by a hydraulic motor 191 is located on rear wall 32 of the wagon adjacent to the opening therein. The purpose of fork mechanism 190 is to advance mixed feed material from the bottom of the feed compartment to blower unit 56 when doors 188 and 189 are opened to allow the feed material to be redistributed to the top of the feed compartment or to be discharged outside via discharge spout 41. Alternatively, fork mechanism 190 may be driven by a power connection (not shown) to one of the shafts of the mixing augers.

As shown in FIG. 4, auger 55 of feed loading mechansim 40 extends transversely between the side walls of housing 42 adjacent to blower unit 56. Auger 55 includes conventional screw sections 192 at its opposite ends which are arranged to convey the ground feed material toward center opening 182 in housing 42 upon rotation of the auger. One or more paddles 193 are provided at the center of auger 55 to drive the ground feed material through opening 182 into blower unit 56. Screen member 54 comprises a pair of concave sections 194 (FIG. 2) mounted behind shafts 50 and provided with large rectangular mesh openings to allow passage of ground feed material to auger 55. When shafts 50 are rotated, pulverizing chains 51 and hammers 52 grind the feed material against screen member 54. The ground feed material is conveyed via auger 55 and blower 56 through discharge chute 41 into the feed compartment.

Referring to FIGS. 7 and 9, feed loading mechanism 40 includes a sprocket 196 on the back of housing 42 driven via an overriding clutch 197 and coupled by a chain 198 to a drive sprocket 200 for blower fan 182. Sliding door 189 includes a vertical slot 201 which allows the door to slide pass the drive shaft of the blower fan. Sprocket 196 is powered by clutch assembly 152 (FIG. 2) via a telescoping power shaft 202 consisting of a series of shaft sections interconnected by universal coupling elements and covered by a shield 203. As shown in FIG. 9, sprocket 196 is coupled via a clutch 204 provided with a clutch control lever 206 to another chain and sprocket combination 208 which drives a right-angle gear box 210. The gear box includes a large sprocket 212 coupled via a chain 214 to a set of sprockets 216 which drive shafts 50 to operate pulverizing chains 51 and hammers 52. An idler sprocket 218 is provided to control the tension of chain 214. In addition, gear box 210 includes a small sprocket 220 coupled via a chain 222 to a drive sprocket 224 for feed auger 55 (FIG. 2) of the feed loading mechanism. An idler sprocket 226 is provided to control the tension of chain 222.

In the operation of feed mixer and transport wagon 20, the wagon is coupled to a tractor and moved to a position with its feed loading mechanism 40 facing a stack of hay, silage or other feed material on the ground. Lock pins 48 are disengaged and hydraulic cylinders 47 are actuated to adjust the feed loading mechanism to the desired level. Transmission control lever 150 is engaged in its forward drive position to transmit power from shaft 151 to paddle conveyor mechanism 80 and to mixing augers 62 and 64. With clutch control lever 206 (FIG. 9) actuated to engage clutch 204, clutch assembly 152 (FIG. 2) is activated to transmit power from shaft 151 to the feed loading mechanism to rotate shafts 50, pulverizing chains 51 and hammers 52, auger 55 and blower fan 181. The pulverizing chains and hammers thrash the stack of feed material and grind the feed material against screen member 54. The ground feed material is passed through screen member 54 to auger 55 which is rotated to advance the ground feed material toward opening 182 (FIG. 4) in housing 42. By action of fan 181 and auger paddle 193, the ground feed material is fed into blower unit 56 and discharged via spout 41 into the feed compartment.

Simultaneously, paddle conveyor mechanism 80 is rotated to move the feed material forwardly along the bottom of the wagon, while mixing augers 62 nd 66 are rotated to uniformly distribute and mix the feed material within the compartment. The action of feed engaging paddles 82 and 84 together with mixing teeth 72 and 78 tends to break up any large chunks of feed material. After the silage is loaded into the feed compartment, clutch assembly 152 is disengaged to terminate rotation of paddle conveyor mechanism 80 and mixing augers 62 and 64. Overriding clutch 197 (FIG. 9) allows the rotation of shafts 50, pulverizing chains 51 and hammers 52, auger 55 and blower unit 56 to continue until the momentum of these components is dissipated. Hydrualic cylinders 47 are actuated to move feed loading mechansim 40 to its raised position where, if desired, it may be locked in place by lock pins 48.

When it is desired to unload the feed material from the wagon, transmission control lever 150 is engged in its forward drive position to rotate paddle conveyor mechanism 80 and mixing augers 62 and 64 and advance feed material forwardly toward the discharge area of the wagon. Clutch assembly 152 is disengaged to preclude operation of feed loading mechanism 40 and blower unit 56. Hydraulic motor 60 (FIG. 4) is activated to operate elevator 59 which conveys the feed material upwardly along discharge chute 57. Discharge spout 58 is flipped downward to allow the feed material to be dispensed into a feed bunk or other storage bin or to dump the feed material on the ground alongside the wagon.

Alternatively, blower unit 56 may be utilized to discharge the feed material from the wagon. With feed loading mechanism 40 and blower unit 56 raised upwardly (FIG. 2), frame members 184 and ledge 185 (FIG. 8) on rear wall 32 of the wagon fit within corresponding frame members 186 and ledge 187 (FIG. 7) on blowe housing 180. In addition, opening 183 of blower housing 180 is moved into alignment with the discharge opening in rear wall 32 of the wagon. Slidable doors 188 and 189 are opened to establish communication between blower unit 56 and the interior of the feed compartment. Transmission control lever 150 is engaged in its reverse drive position to rotate paddle conveyor mechanism in its reverse direction, i.e., counterclockwise as viewed in FIG. 6, to advance the feed material rearwardly along the bottom of the feed compartment. With clutch assembly 152 (FIG. 2) engaged to transmit power to blower unit 56 and clutch 204 (FIG. 9) disengaged to prevent operation of the feed loading mechanism, blower fan 181 is rotated to draw the feed material through opening 183 into blower housing 180. Hydraulic motor 191 is also actuated to oscillate fork mechanism 190 which assists in the movement of feed material into the blower unit. The feed material is driven upwardly through discharge spout 41 which can be adjusted to either redistribute the feed material into the top of the feed compartment or to discharge the feed material to an external storage container. Similarly, the wagon may be used in the spreading of crop refuse for livestock bedding.

The invention provides a self-loading feed mixer and transport wagon which advntageously allows a stack of feed material to be ground, loaded, mixed and dispensed via a single piece of farm machinery. The wagon eliminates the need for an expensive tub grinder previously required for grinding hay. In addition, the improved structure of the paddle conveyor and mixing augers in the feed compartment reduces the possibility of breakdown and damage to these components and minimizes the power required to operate the machine.

The present invention is not limited to the specific details shown and described, and modifications may be made in the self-loading feed mixer and transport wagon without departing from the principles of the invention.

We claim:

1. A self-loading feed mixer and transport apparatus, comprising:

a vehicle adapted to be transported on the ground;
a feed compartment mounted on said vehicle and adapted to receive a load of feed material;
mixer means mounted in said feed compartment for agitating and mixing the feed material therein; and
feed grinding and loading means mounted on said vehicle and positioned outside of said feed compartment to engage a stack of feed material on the ground, said grinding and loading means including
a housing mounted outside of said feed compartment;
a plurality of flail-like pulverizing members mounted on a rotatable shaft within said housing for thrashing the stack of feed material;
a screen member spaced from said rotatable shaft within said housing and cooperable with said pulverizing members for grinding the feed material upon rotation of said shaft; and means for loading the ground feed material into said compartment.

2. The apparatus of claim 1, wherein said pulverizing members comprise:
a plurality of chains mounted on said shaft, each provided with a hammer device for thrashing the stack of feed material upon rotation of said shaft and grinding the feed material against said screen member.

3. The apparatus of claim 1, wherein said screen member comprises:
a concave screen section mounted behind said shaft and provided with a plurality of rectangular mesh openings which allow passage of the ground feed material therethrough.

4. The apparatus of claim 1, wherein said grinding and loading means includes:
a blower unit for receiving the ground feed material and blowing the material into said feed compartment.

5. The apparatus of claim 4, wherein said grinding and loading means includes:
auger means located behind said screen member for feeding the ground feed material to said blower unit.

6. The apparatus of claim 1, which includes:
means for raising and lowering said housing relative to said feed compartment to allow said pulverizing members to engage the stack of feed material at different levels.

7. A self-loading feed transport apparatus, comprising:
a vehicle adapted to be transported on the ground and positioned adjacent to a stack of feed material;
a feed compartment mounted on said vehicle and adapted to receive a load of feed material; and
a feed grinder and loader mechanism mounted on said vehicle and positioned outside of said feed compartment for movement into engagement with the stack of feed material on the ground, said grinder and loader mechanism including
a loader housing mounted outside of said feed compartment;
a plurality of flail-like pulverizing members mounted on a rotatable support within said housing for thrashing the stack of feed material;
a screen member spaced from said rotatable support within said housing and cooperable with said pulverizing members for grinding the feed material upon rotation of said support; and
means for loading the ground feed material into said compartment.

8. The apparatus of claim 7, wherein said pulverizing members comprise:
a plurality of chains mounted on said support, each provided with a hammer device for thrashing the stack of feed material upon rotation of said support and grinding the feed material against said screen member.

9. The apparatus of claim 7, wherein said screen member comprises:
a concave screen section mounted behind said support and provided with a plurality of rectangular mesh openings which allow passage of the ground feed material therethrough.

10. The apparatus of claim 7, which includes:
a blower unit for receiving the ground feed material from said loader housing; and a discharge spout for directing the ground feed material from said blower unit into said feed compartment.

11. The apparatus of claim 10, which includes:
auger means located behind said screen for feeding the ground feed material to said blower unit.

12. The apparatus of claim 7, wherein:
said loader housing is vertically adjustable in position relative to said feed compartment.

13. The apparatus of claim 12, which includes:
means for raising and lowering said housing relative to said feed compartment to allow said pulverizing members to engage the stack of feed material at different levels.

14. A self-loading feed mixer and transport apparatus adapted to be transported on the ground and positioned adjacent to a stack of feed material, comprising:
a feed compartment adapted to receive a load of feed material;
mixer means mounted in said feed compartment for agitating and mixing the feed material therein;
loading means mounted outside of said feed compartment and adapted to engage a stack of feed material on the ground, said loading means including means for pulverizing and grinding the stack of feed material and means for loading the ground feed material into said compartment;
conveyor means including a shaft rotatably mounted along the bottom said feed compartment and a set of feed engaging paddles spaced along said conveyor shaft for advancing the feed material in a predetermined direction through said compartment upon rotation of said conveyor shaft; and
each feed engaging paddle being mounted on a radial support stem slidably attached to said conveyor shaft to allow said paddle to move radially relative to said shaft to relieve pressure on the feed material.

15. The apparatus of claim 14, wherein:
at least one radial support stem is pivotally attached to said conveyor shaft to allow said support stem and its paddle to pivot out of the path of wadded feed material advanced through said feed compartment.

16. The apparatus of claim 15, wherein:
said one radial support stem is rotatably mounted on said conveyor shaft to allow its paddle to rotate relative to said shaft to relieve pressure on the feed material.

17. The apparatus of claim 14, wherein:
each feed engaging paddle is positioned in a diagonal orientation relative to the axis of said conveyor shaft to advance the feed material.

18. The apparatus of claim 17, wherein:
at least one of said feed engaging paddles is rotatably mounted on said conveyor shaft, said paddle being normally located in its diagonal orientation relative to the axis of said shaft and being rotatable toward a perpendicular orientation when the feed material tends to bunch up to relieve the pressure thereon.

19. The apparatus of claim 14, wherein said mixer means comprises:
a pair of spaced, parallel mixing augers rotatably mounted in an upper portion of said feed compartment and extending parallel to said conveyor shaft.

20. The apparatus of claim 19, wherein:

each mixing auger includes a plurality of mixing teeth mounted on a set of resilient support arms spaced along said mixing auger.

21. The apparatus of claim 20, wherein:

each of said mixing teeth is oriented diagonally relative to the axis of said auger for moving the feed material in the opposite direction.

22. A self-loading feed mixer wagon for grinding and mixing livestock feed material, including:

a feed compartment including a pair of side walls, a pair of end walls and a bottom wall arranged to provide an open top end for receiving a load of feed material, said compartment including a discharge area from which the feed material is discharged;

a conveyor mechanism including a shaft rotatably mounted at the bottom of said compartment and extending longitudinally between said end walls and a set of feed engaging paddles spaced along said conveyor shaft for advancing the feed material in a predetermined direction toward said discharge area upon rotation of said conveyor shaft;

a set of spaced, parallel mixing augers rotatably mounted in an upper portion of said compartment adjacent to said side walls and extending longitudinally through said compartment between said end walls for agitating and mixing the feed material supplied to said compartment upon rotation of said mixing augers;

a feed loading mechanism mounted on the outside of said compartment and adapted to engage a stack of feed material on the ground, said feed loading mechanism including a housing mounted adjacent to one end wall of said feed compartment;

a plurality of pulverizing chains mounted on a rotatable shaft supported on said housing for thrashing a stack of feed material;

a screen member spaced from said rotatable shaft within said housing and cooperable with said pulverizing chains for grinding the feed material upon rotation of said shaft; and means for loading the ground feed material into said compartment.

23. The feed mixer wagon of claim 22, wherein:

each pulverizing chain is connected at one end to said shaft and is provided with a hammer at its other end for driving the feed material into said screen member.

24. The feed mixer wagon of claim 22, wherein said feed loading mechanism includes:

a blower unit for receiving the ground feed material and blowing the material into said compartment.

25. The apparatus of claim 24, which includes:

auger means located behind said screen for feeding the ground feed material to said blower unit.

26. The feed mixer wagon of claim 24, wherein said blower unit includes:

a discharge spout for directing the feed material into the open top end of said feed compartment.

27. The feed mixer wagon of claim 26, which includes:

a dust cover mounted on said side walls and end walls of said feed compartment and provided with a shroud for receiving said discharge spout.

28. The feed mixer wagon of claim 26, wherein:

said discharge spout is adjustable to allow the feed material to be distributed to the top of said feed compartment or to be discharged outside said compartment.

29. The feed mixer wagon of claim 28, wherein:

said feed compartment includes a first opening formed in said one end wall at the bottom of said compartment and said blower unit includes a second opening registrable therewith to provide communication between the interior of said compartment and said blower unit and allow mixed feed material to be removed from the bottom of said compartment by said blower unit.

30. The feed mixer wagon of claim 29, which includes:

feed advance means mounted on said feed compartment adjacent to said first opening therein for advancing the mixed feed material from said first opening in said compartment toward said second opening in said blower unit.

31. The feed mixer wagon of claim 29, wherein:

each opening is provided with a door movable between open and closed positions to selectively provide communication between said feed compartment and blower unit.

32. The feed mixer wagon of claim 26, which includes:

a cover mounted over the open top end of said feed compartment and provided with a shroud for receiving said discharge spout.

33. The feed mixer wagon of claim 22, which includes:

means for raising and lowering said housing relative to said feed compartment to allow said pulverizing chains to engage the stack of feed material at different levels.

34. The feed mixer wagon of claim 22, which includes:

a discharge elevator in communication with said discharge area of said compartment for discharging the mixed feed material therefrom.

35. The feed mixer wagon of claim 22, wherein:

each feed engaging paddle is positioned in a diagonal orientation relative to the axis of said conveyor shaft to advance the feed material.

36. The feed mixer wagon of claim 35, wherein:

one or more of said paddles located adjacent to said discharge area are reversed in diagonal orientation to relieve pressure on the feed material advanced to said discharge area.

37. The feed mixer wagon of claim 36, wherein:

one or more of said paddles are rotatably mounted on said conveyor shaft, said paddles being normally oriented diagonally relative to the axis of said shaft and being rotatable toward a perpendicular orientation when the feed material tends to bunch up to relieve the pressure thereon.

38. The feed mixer wagon of claim 22, wherein:

each mixing auger includes a plurality of teeth mounted on a set of spiral shaped spring arms spaced along said auger.

39. The feed mixer wagon of claim 38, wherein:

each of said mixing teeth is oriented diagonally relative to the axis of said auger for moving the feed material in the opposite direction.

40. The apparatus of claim 22, which includes:

a pair of spaced, parallel shafts rotatably mounted on said housing, each shaft being provided with a plurality of pulverizing chains for thrashing the stack of feed material; and said screen member comprising a pair of concave sections mounted behind the respective shafts against which the feed material is ground by said pulverizing chains.

41. The feed mixer wagon of claim 22, which includes:
a dust cover mounted on said side walls and end walls of said feed compartment.

42. In a feed mixer apparatus having a feed compartment adapted to receive a load of feed material and provided with a discharge area from which the feed material is discharged, a conveyor mechanism comprising:
a rotatable shaft extending through said compartment toward said discharge area;
a set of feed engaging paddles spaced along said conveyor shaft, each paddle being positioned in a diagonal orientation relative to the axis of said shaft to advance the feed material toward the discharge area upon rotation of said shaft; and
each paddle being resiliently mounted on said conveyor shaft to allow said paddle to move radially inward relative to said shaft to relieve pressure on the feed material.

43. The apparatus of claim 42, wherein:
one or more of said paddles located adjacent to said discharge area are reserved in diagonal orientation to relieve pressure on the feed material advanced to said discharge area.

44. The apparatus of claim 43, wherein:
one or more of said paddles are rotatably mounted on said conveyor shaft, said paddles being normally oriented diagonally relative to the axis of said shaft and being rotatable toward a perpendicular orientation when the feed material tends to bunch up to relieve the pressure thereon.

45. The apparatus of claim 42, which includes:
a pair of spaced, parallel mixing augers mounted in an upper portion of said feed storage compartment and extending parallel to said conveyor shaft for agitating and mixing the feed material upon rotation of said mixing augers.

46. The apparatus of claim 45, wherein each mixing auger comprises:
a rotatable shaft mounted in an upper portion of said compartment;
a set of spiral-shaped spring arms spaced along said shaft; and
a plurality of mixing teeth mounted on said spiral-shaped arms to agitate and mix the feed material upon rotation of said shaft.

47. The apparatus of claim 46, wherein:
each of said mixing teeth is oriented diagonally relative to the axis of its shaft for moving the feed material in the opposite direction.

* * * * *

UNITED STATES PATENT AND TRADEMARK OFFICE
CERTIFICATE OF CORRECTION

PATENT NO. : 4,330,091
DATED : May 18, 1982
INVENTOR(S) : Antonie G. Rozeboom and John H. Van Beek It is certified that error appears in the above—identified patent and that said Letters Patent is hereby corrected as shown below:

In Claim 43, at column 17, line 27, the term "reserved" is changed to --reversed--.

Signed and Sealed this

Twelfth Day of October 1982

[SEAL]

Attest:

GERALD J. MOSSINGHOFF

*Attesting Officer*     *Commissioner of Patents and Trademarks*